United States Patent
Deuerling-Zheng et al.

(10) Patent No.: US 8,023,732 B2
(45) Date of Patent: Sep. 20, 2011

(54) ACCELERATED IMAGE REGISTRATION BY MEANS OF PARALLEL PROCESSORS

(75) Inventors: Yu Deuerling-Zheng, Erlangen (DE); Christian Eisenacher, Ebelsbach (DE); Adam K. Galant, Carpentersville, IL (US); Joachim Hornegger, Effeltrich (DE); Marc Stamminger, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 968 days.

(21) Appl. No.: 11/780,971

(22) Filed: Jul. 20, 2007

(65) Prior Publication Data
US 2008/0037845 A1 Feb. 14, 2008

Related U.S. Application Data

(60) Provisional application No. 60/833,623, filed on Jul. 26, 2006.

(51) Int. Cl.
*G06K 9/00* (2006.01)
(52) U.S. Cl. ............................ 382/168; 375/240.16
(58) Field of Classification Search ................ 382/168
See application file for complete search history.

(56) References Cited

U.S. PATENT DOCUMENTS

| | | | |
|---|---|---|---|
| 2003/0059110 A1* | 3/2003 | Wilt | 382/168 |
| 2003/0088542 A1* | 5/2003 | McGee et al. | 707/1 |
| 2005/0078755 A1* | 4/2005 | Woods et al. | 375/240.24 |
| 2005/0226336 A1* | 10/2005 | Nakaya | 375/240.16 |
| 2005/0276330 A1* | 12/2005 | Park et al. | 375/240.17 |

OTHER PUBLICATIONS

Translation and German Office Action dated Mar. 21, 2007 for DE 10 2006 035 229.7.
Deuerling-Zheng, et al.; "Motion compensation in digital angiography using graphics hardware"; Computerized Medical Imaging and Graphics, vol. 30, Issue 5, Jul. 2006, pp. 279-289.
Levin, et al.; "Acceleration of 3D, nonlinear warping using standard video graphics hardware"; Computerized Medical Imaging and Graphics, vol. 28, Dec. 2004, pp. 471-483.
Hui Zhu, et al., Tracking 3-D coronary artery motion with biplane angiography; Biomedical Imaging, 2002; Proceedings 2002 IEEE International Symposium on Publication Date: 2002, pp. 605-608; Posted online: Nov. 7, 2002 17:10:27.0.
Srinivasan, et al.; "Predictive Coding Based on Efficient Motion Estimation"; IEEE Transactions on Communications, vol. 33, Issue 8, Aug. 1985, pp. 888-896.
Kelly, et al.; "Fast Image Interpolation for Motion Estimation using Graphics Hardware", Visualization and Data Analysis 2004, Proceedings of the SPIE, vol. 5297, pp. 184-194 (2004).
Erik Meijering; "Image Enhancement in Digital X-Ray Angiography", Image Sciences Institute, Utrecht University, Utrecht, the Netherlands, 2000.

* cited by examiner

*Primary Examiner* — Hadi Akhavannik
(74) *Attorney, Agent, or Firm* — Lempia Summerfield Katz LLC (57) ABSTRACT

A method is provided for accelerating non-rigid image registration, using parallel processors. To that end, on a commercially available graphics card, a block-matching algorithm is implemented, which, by histogram-based similarity standards, calculates the motion vectors for individual blocks. All the blocks are processed simultaneously and individually. The complete motion vector field is obtained by bilinear interpolation. Optimized search methods, such as conjugate direction searching, are employed. The algorithm terminates once the optimal displacement has been found for all the blocks. The registration is done completely on the graphics card. The algorithm is fully automatic, precise, and fast. The program may be employed for instance in registration for digital subtraction angiography.

15 Claims, 9 Drawing Sheets

Target A       Target B       Target A

ACCELERATED IMAGE REGISTRATION BY MEANS OF PARALLEL PROCESSORS

RELATED APPLICATION

The present patent document claims the benefit of the filing date under 35 U.S.C. §119(e) of Provisional U.S. Patent Application Ser. No. 60/833,623, filed Jul. 26, 2006, which is hereby incorporated by reference.

BACKGROUND

The present embodiments relate to a method for accelerating non-rigid image registration, using parallel processors. Image registration is a task that is significant in medical image processing. Because of the many possibilities in examination, medical images can be made at different times or using different equipment. Combining these images can help the physician substantially in diagnosis. However, this requires geometrical 1:1 correspondence of the objects to be assessed. The task of image registration is therefore to determine this correspondence.

Image registration is used in digital subtraction angiography (DSA). DSA is a currently used method for visualizing vessels. A "mask image"—a digital X-ray image prior to the administration of contrast agent—is first made. Then, the radio contrast agent is injected and "contrast images" are taken—a series of successive images in which the vessels are filled with contrast agent. In the next step, the mask image is subtracted from each of the contrast images, so that, by the end, only the target structures—that is, the contrast agent-filled vessels—are shown. The resultant differential images, however, are diagnostically conclusive only if the structures in the two input images are oriented relative to one another.

Since the images are taken at different times, there is often a 3-dimensional change in the structures, usually from patient movement. Although many principles for avoiding patient motion before and during the scanning are available, nevertheless not all kinds of motion can be prevented, such as heartbeats, the urge to cough, or swallowing. Reverse registration of the two images that are to be subtracted is therefore necessary. A transformation is determined that describes the motion mathematically. The geometrical transformation that takes place substantially comprises translational motions, but also slight rotations, scaling, and even deformations also occur. As a consequence, rigid registration typically does not suffice. Although non-rigid methods provide markedly better results, still they entail major computation expense.

Figure 1:
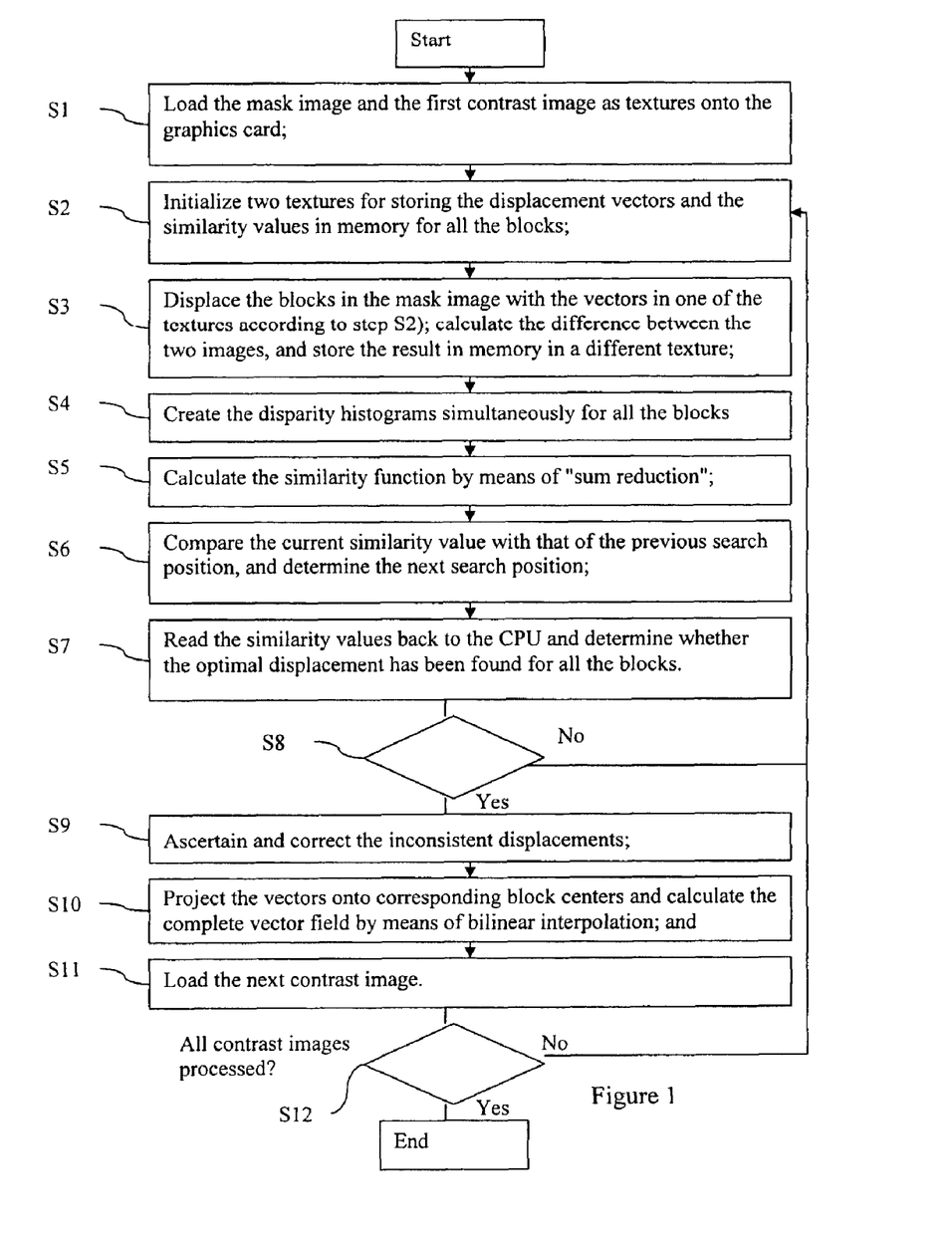
FIG. 1 is a flow chart that describes the method of one embodiment.
Figure 2:
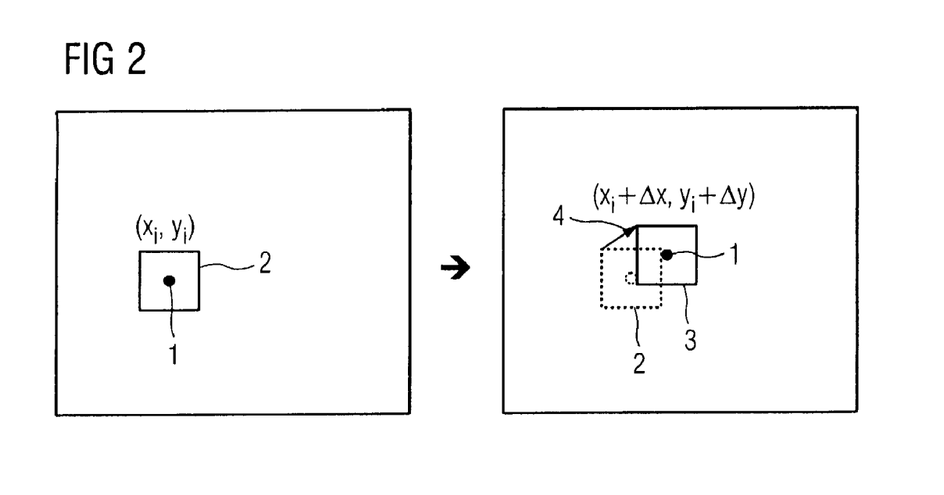
FIG. 2 is a sketch explaining block matching.

One known example of the non-rigid methods for motion correction is block matching. The displacement vector of a pixel is determined approximately by optimizing the similarity between the two blocks that, in the respective image, surround the pixel (FIG. 2). To achieve precise registration results, there is a need for robust similarity standards. Because of the inflow of contrast agent, a change in the average intensity level exists in the two frames. The similarity standards that analyze the intensity difference directly are unsuited to DSA. Conversely, histogram-based similarity standards do not determine the correspondence with the actual intensity disparities, but rather with the relative frequency of disparities. In "Image Enhancement in Digital X-Ray Angiography" by E. Meijering, PhD thesis, Image Sciences Institute, Utrecht University, 2000, it is shown that such similarity standards are intrinsically robust with respect to the inflow of contrast agent.

It is known that calculating histograms is computation-intensive. Consequently, the entire algorithm is not efficient enough to make the registered images available to the physician immediately after the images have been made.

SUMMARY

A method for non-rigid image registration is performed by parallel processors. The method includes the following steps:
applying a block-matching algorithm;
creating a histogram;
ascertaining histogram-based similarity standards; and
ascertaining the displacement vectors.

By the use of parallel processors, the registration sequence is sped-up. One of the family of parallel processors is the graphics card. Graphics cards serve as an interface for visual output of data on the screen. In recent years, the power and performance of graphics cards has grown enormously. The development of graphics cards is faster than Moore's Law and exceeds the development of CPUs.

Via OpenGL or DirectX-API, the hardware may be accessed as directly as possible. This property makes it possible to transfer generally valid (nongraphic) tasks onto the graphics hardware.

The method can advantageously have the following steps:
a 2-dimensional non-rigid image registration for X-ray images of the digital subtraction angiography is effected; and
the block-matching algorithm, which, by histogram-based similarity standards, calculates the displacement vectors, is executed on a graphics card with parallel processors.

Data transmission between the CPU and a GPU can be avoided if the displacement vectors are stored in memory on the graphics card.

The parallel processors may execute the block-matching algorithm for all the blocks in parallel and at the same time individually.

The parallel processors may create the histogram for an image or a detail of an image, with the aid of frame buffer alpha blending, and can calculate the similarity function by sum reduction.

The parallel processors can terminate the search automatically once the optimal displacement for all the blocks has been found, and the similarity values can be read back to the CPU and assessed there.

The parallel processors may ascertain the inconsistent displacements automatically and correct the inconsistent displacements as needed.

The displacement vectors may be projected onto the respective block centers, and the complete vector field may be calculated by linear interpolation.

The block-matching algorithm for 2-dimensional or 3-dimensional image registration may be implemented entirely on parallel processors.

The robustness of the similarity function is guaranteed, and the image can be divided for the sake of simplicity into an integral number of blocks, such as blocks with a block size of 64×64 pixels.

The pixel registration can be done first, and then a sub-pixel registration may be performed.

The method for accelerating the 2-dimensional non-rigid image registration for digital subtraction angiography (DSA) relates to a block-matching algorithm, performed on a graphics card. The displacement vectors are ascertained by histogram-based similarity standards. The method includes the following steps:
a) load the mask image and the first contrast image as textures onto the graphics card;

b) initialize two textures for storing the displacement vectors and the similarity values in memory for all the blocks;

c) displace the blocks in the mask image with the vectors in one of the textures according to step b); calculate the difference between the two images, and store the result in memory in a different texture;

d) create the disparity histograms simultaneously for all the blocks;

e) calculate the similarity function by "sum reduction";

f) compare the current similarity value with that of the previous search position, and determine the next search position;

g) read the similarity values back to the CPU and determine whether the optimal displacement has been found for all the blocks. If not, return to step b); if so, proceed to step h);

h) ascertain and correct the inconsistent displacements;

i) project the vectors onto corresponding block centers and calculate the complete vector field by bilinear interpolation; and j) load the next contrast image and go to step b). The program is terminated once all the contrast images have been processed.

The complete algorithm for 3-dimensional non-rigid image registration can be implemented on parallel processors.

DETAILED DESCRIPTION OF THE EMBODIMENTS

In FIG. 2, the fundamental concept of the block-matching algorithm is shown. After a displacement of a point 1 of interest (POI) with $(x_1, y_1)$, the displacement is to be ascertained. A surrounding window 2 identifies the displacement. A search is performed for the window 3 that is closest to the window 2 and that has a displacement vector 4. The POI with $(x_1+\Delta x, y_1+\Delta y)$ is located in the middle of this window.

Figure 3:
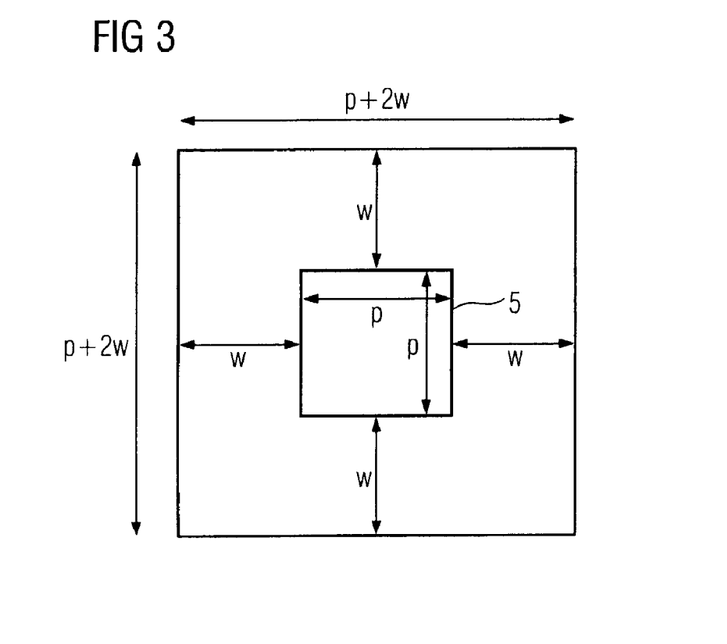
FIG. 3 is an illustration of the given conditions in the exhaustive search.

The conditions of the known full search will now be explained with the aid of FIG. 3. The search window 5 has a height of p and a width of q. The edges of the search window 5 have a spacing w from the outer edges of the image, so that the outer edges of the image have a size of p+2w and q+2w, respectively. In the full search, the search window 5 is now moved over the full surface of the image, resulting in a computing expenditure of $(2w+1)^2$.

Figure 4:
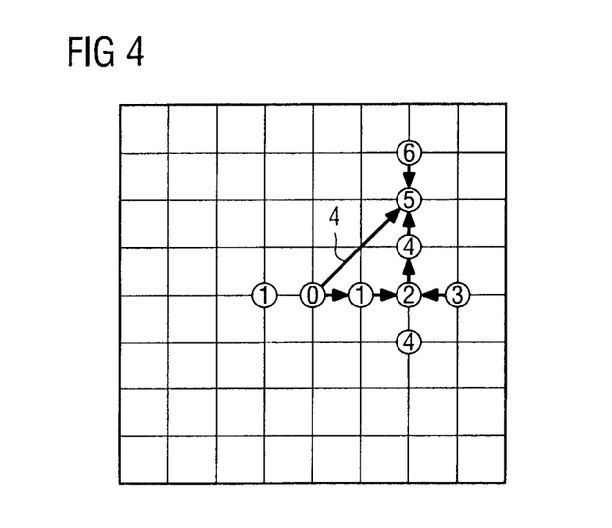
FIG. 4 is an illustration to explain the conjugate direction search according to the invention.

In the direction search in one embodiment, the search begins along the x axis, and the starting point (0) is compared with its neighboring points (1). Further searching is then done in the direction that gives the best result. The next points found are point (2) and then point (3). In this example, the point (3) has produced a worsening. From point (2), searching is now done onward in both directions along the y axis, and the upper one of the points (4) produces the best result in this example. In the point (4) direction, point (5) and then point (6) are first compared. Since point (6) has again produced worsening, the point searched for with a displacement 4 is the point (5).

Block Matching:

Graphics processors (Graphics Processor Units or GPUs) are able to process large amounts of data in parallel. As a consequence, the implementation of the block-matching algorithm is adapted accordingly. If block matching is transferred onto the CPU, then typically the blocks are displaced in sequence (within the search space), and the similarities are examined sequentially. To exploit the power and capacity of the GPU, the entire image is displaced with each of the motion vectors to be examined, and at the same time to analyze the similarity function.

On the other hand, in order to utilize the optimized search methods, such as conjugate direction searching, the motion vectors for the blocks are calculated individually.

The article "Fast Image Interpolation for Motion Estimation using Graphics Hardware" by Kelly et al, Proceedings of the SPIE, Vol. 5297, pages 184 through 194, 2004, mentions some implementations of block matching on graphics cards, but only exhaustive searching methods were used for the purpose. In one embodiment of the current approach, each block is allocated an index. The blocks are processed individually and simultaneously. Moreover, the displacement vectors are stored in memory on the graphics card, to avoid data transmission between the CPU and the GPU.

There are two factors that decide the computation expense, namely the number of blocks and the block size. The expense is too high if one block is defined for each pixel. The known control-point-based registration method is used, and the control points are defined with the aid of a regular grid. The size of a block is associated with the robustness of the similarity function. Although a larger block does include more statistical information and thus furnishes more-reliable results, it is more intensive in terms of computation. In Meijering, an order of magnitude of 51×51 pixels has been considered appropriate. In one embodiment, the size of 64×64 pixels is used, so that (a) the robustness of the similarity function is guaranteed, and (b) the image can be divided for the sake of simplicity into an integral number of blocks, since the medical images usually available are on the order of magnitude of powers of two.

Histogram Creation:

Histogram-based similarity standards may be robust quality standards against a change in the intensity level in DSA. However, the assessment of such quality standards uses the majority of the computation time. A histogram on the CPU is usually implemented as a field that long enough to provide possible intensity values. The intensity values are selected as the indexes. The pixels of the same intensity value are counted together in the corresponding field element (histogram entry). The histogram is first initialized with zeroes. The image to be processed is then scanned, and, for each pixel, the corresponding histogram entry is increased by one.

As described above, for the histogram creation, two operations are performed simultaneously:

Gathering (calling up the intensities of the pixels) and scattering (for each pixel, increasing the corresponding histogram entry by one). This may not have been possible on a graphics card of the previous generation, since in the vertex shader, only scattering was possible, while in the pixel shader, only gathering was possible. In one embodiment of the current approach, vertex texturing is been employed. With the aid of vertex texturing, gathering can also be performed in the vertex shader.

Frame buffer alpha blending may be used. Alpha blending mixes the colors of the pixels in the frame buffer that are output to the same position on the screen. The pixels are additively mixed. In the first pass (rendering pass), two images are subtracted pixel by pixel, and the result is written into a texture. In the second pass, this texture is transferred to the vertex shader as input, and the intensity is output as an x coordinate while the blocking index of each texel is output as a y coordinate. All the texels t within one block that have the same intensity value are for output to the same position on the screen. The intensity of the output pixel p represents the frequency of the texel t; the position of the pixel p is an indication of the intensity and the block association of the texels t. By this procedure, the histograms for all the blocks are created in parallel on the GPU.

Calculation of the Similarity Standards:

In the case of optimal orientation, only a small number of differential values have a relatively high frequency, while the majority of the differential values have a relatively low frequency. With histogram-based similarity standards, this fact is utilized in that a weighted summation is performed on the histogram entries. Suitable examples include, for example, the energy of the disparity histogram and the entropy of the disparity histogram, as is described in Meijering.

Figure 5:
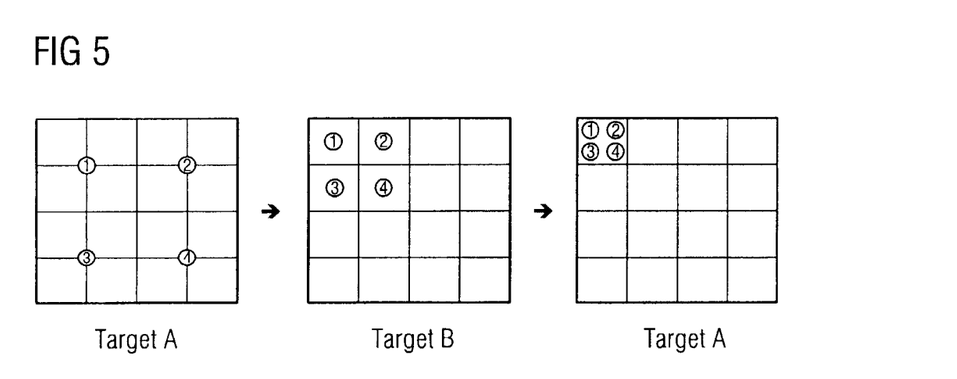
FIG. 5 is an illustration to explain the sum reduction by the ping-pong method, according to one embodiment.

While the graphics cards process the data in parallel, there is no global accumulator. Consequently, the summation is performed over a plurality of passes, for example by progressive downsampling. To that end, in each pass, the local sum of n×n pixels is allocated to one pixel in the target texture, as is explained in conjunction with FIG. 5. In each pass, an image is reduced by the factor of n along each axis; for an image whose size is N×N, logn N passes are needed. This method is also known as "sum reduction". FIG. 5 also shows that for this operation, only two textures are used, to avoid the risk of memory defragmentation. The sums are formed for each 2*2 pixels in target A and the sums are stored in memory in one pixel each in target B. After that, each 2*2 pixel region is again combined in target B and stored in memory in one pixel in target A, so that the latter contains the sum of 4*4.

Search Method:

For block matching, a suitable search method is performed. The exhaustive search may be used, but is highly computation-intensive. By that method, $(2w+1)^2$ possible positions in the search space, where w is the number of pixels in all directions (FIG. 2), are examined. Hence such a method is acceptable for a relatively small amount of data.

Various optimization methods may be used. One frequently used method is conjugate direction searching, as in the article "Predictive Coding Based on Efficient Motion Estimation" by Srinivasan et al, IEEE Transactions on Communications, Vol. 33, Issue 8, August 1985, pages 888 to 896, in which the search first takes place in one direction (for instance, horizontally), until the optimum is reached. After that, from that point, the search takes place in the other direction (for instance, vertically) (FIG. 3). The complexity of conjugate direction searching is readily apparent. In integral precision, five positions in the best case and (2w+3) positions in the worst case are examined.

In one embodiment, the search method is implemented entirely on the graphics card. For this purpose, two textures are used, whose elements are four-dimensional vectors. The x and y components of the displacement vector are present in the red and green channels, respectively. The current similarity value is stored in memory in the alpha channel, and the blue channel is used to store the status of the search process in memory. Two textures are used, since if only one texture is used, the writing and reading operations cannot be done in one pass.

If the optimal displacement vector in each case for all the blocks has been found, the algorithm is terminated immediately. To that end, in the most recently updated texture, the texels are accumulated by sum reduction and read back into the CPU. The value in the blue channel is an indication of whether the optimal displacement has already been found.

Sub-pixel Precision:

Even distortions of a fraction of a pixel may lead to significant artifacts in the subtracted image. The calculation of the displacement vectors is done with sub-pixel precision in one embodiment. One method employed assesses the similarity function, once one of the images has been displaced by the fraction of a pixel. To that end, the displaced image is regenerated by resampling. On the graphics card, this operation is performed very quickly by bilinear interpolation. In one embodiment, the search is done hierarchically. First, the optimal displacement is found with integral precision, and then a further search is performed with a sub-pixel precision of 0.1 pixels. The search space for sub-pixel precision may be limited, such as limiting to [−0.5, 0.5]×[−0.5, 0.5] on the assumption that the displacement being searched for is closer to the integral displacement found.

Recognition and Correction of Inconsistency:

The block size and the similarity standard should be selected such that the algorithm furnishes reliable results. Nevertheless, occasional inconsistency cannot be entirely prevented. The program may be capable of automatically recognizing such inconsistencies and correcting them as needed. In one embodiment, the inconsistency check is performed by comparing a vector with its neighbor in the 8-surrounding vector neighborhood. The ratio of the length and the angle between the vectors are used as criteria. If these criteria are met for more than half the neighboring vectors, then the vector is considered inconsistent. An inconsistent vector is replaced by the average vector of its consistent neighbors.

Interpolation of the Displacement Vectors:

The displacement vector for a block is searched by displacing all the pixels within this block using the same vector. However, if the vector found is then projected onto the pixels in the same way, artifacts may be created at the edges of the blocks. The vectors therefore pertain only to the corresponding block centers. The complete vector field is obtained by bilinear interpolation. While the entire image is broken down into blocks, the block centers are located inside the image. The vector field that results from this can thus not completely cover the image. Additional points may be added outside the image and assigned zero vectors.

Algorithm:

A method accelerates the 2-dimensional non-rigid image registration for digital subtraction angiography using graphics cards. To that end, a block-matching algorithm is transferred onto the graphics card, and histogram-based similarity standards are used to calculate the displacement vectors. These operations may be performed using the following steps:

S1 Load the mask image and the first contrast image as textures onto the graphics card.

S2 Initialize two textures for storing the displacement vectors and the similarity values in memory for all the blocks.

S3 Displace the blocks in the mask image with the vectors in one of the textures according to step S2); calculate the difference between the two images, and store the result in memory in a different texture.

S4 Create the disparity histograms simultaneously for all the blocks.

S5 Calculate the similarity function by "sum reduction".

S6 Compare the current similarity value with that of the previous search position, and determine the next search position.

S7 Read the similarity values back to the CPU and determine whether the optimal displacement has been found for all the blocks.

S8 If not, return to step S2; if so, proceed to step S9.

S9 Ascertain and correct the inconsistent displacements.

S10 Project the vectors onto corresponding block centers and calculate the complete vector field by bilinear interpolation.

S11 Load the next contrast image.

S12 Have all the contrast images been processed? If not, go to step S2; if so, program is terminated.

Figure 6:
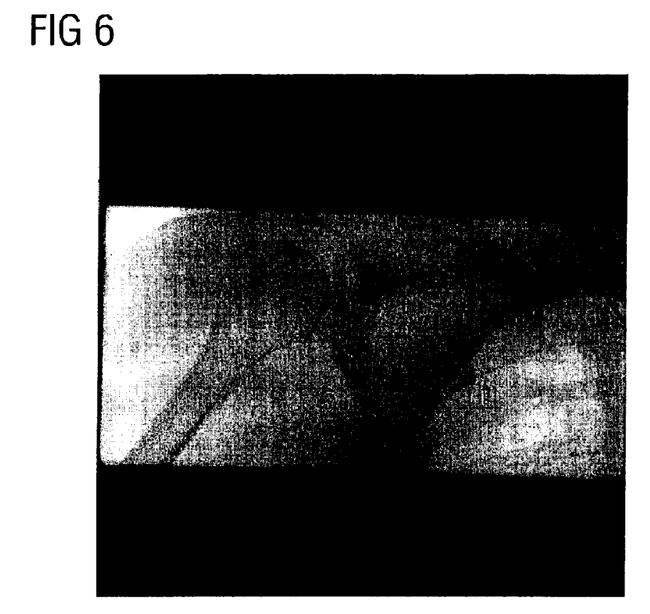
FIG. 6 is a mask image of the shoulder in which the vessels are free of contrast agent.
Figure 7:
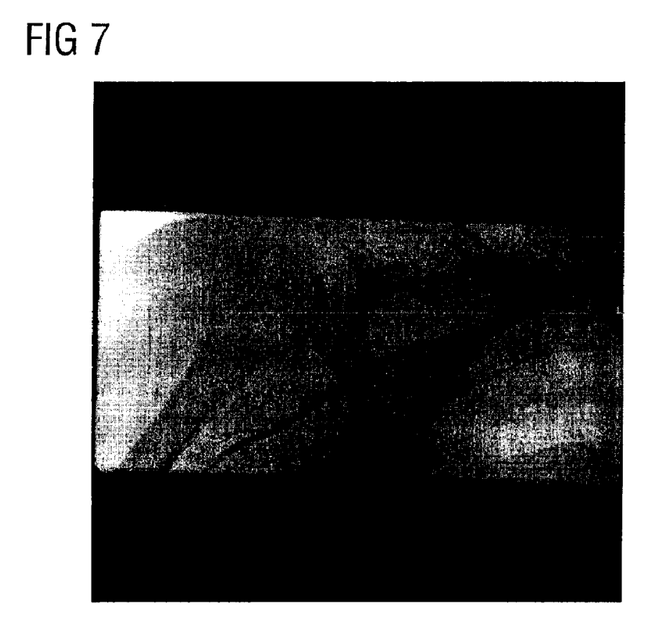
FIG. 7 is a mask image of the shoulder showing blood vessels with contrast agent.
Figure 10:
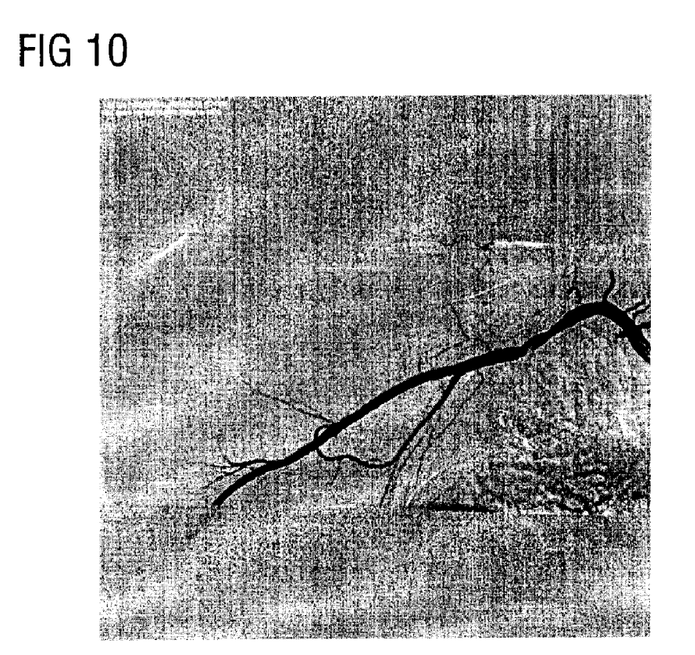
FIG. 10 is a subtraction image with GPU registration with sub-pixel precision, in which the artifacts have nearly disappeared.
Figure 11:
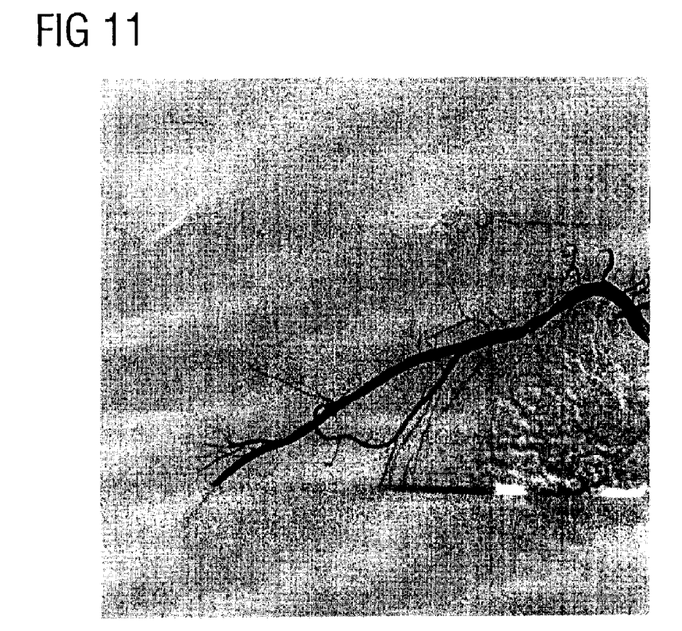
FIG. 11 is a subtraction image with CPU registration for comparison.
Figure 12:
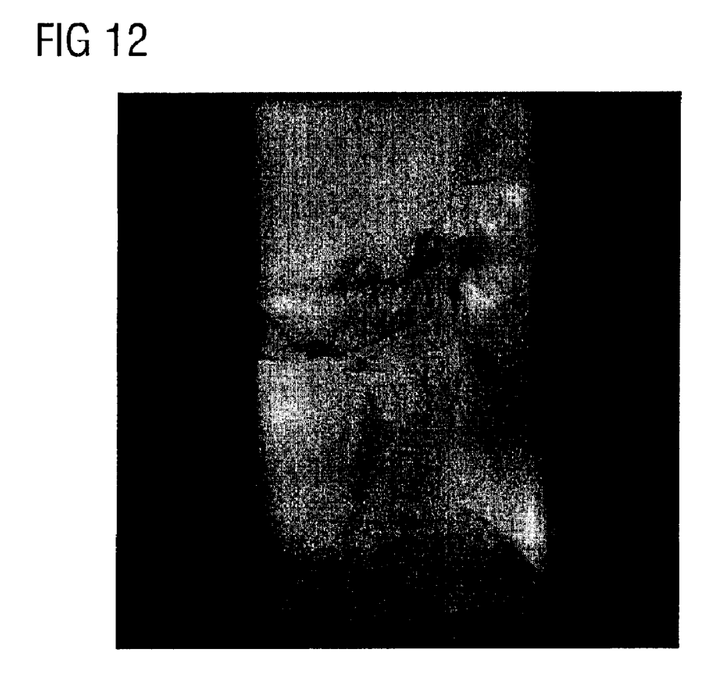
FIG. 12 is a mask image of the head, with the vessels free of contrast agent.
Figure 13:
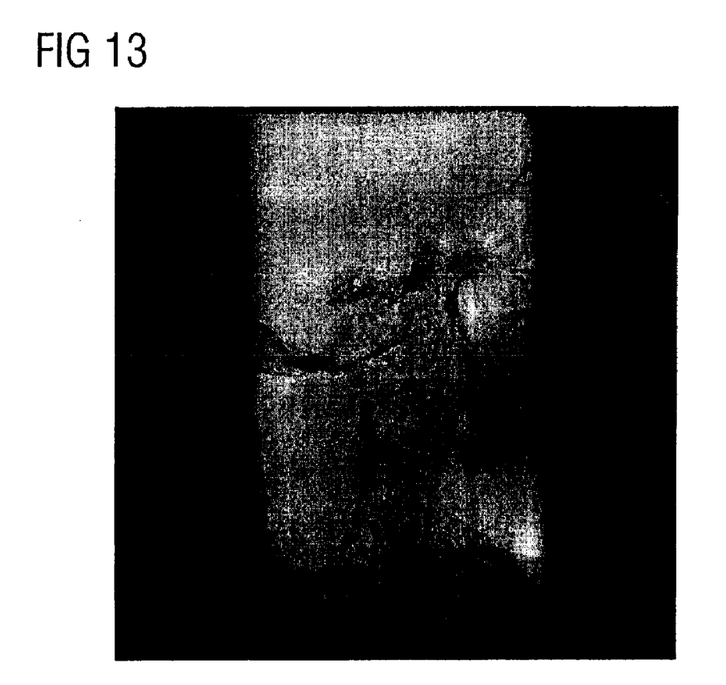
FIG. 13 is a mask image of the head, with blood vessels with contrast agent.
Figure 16:
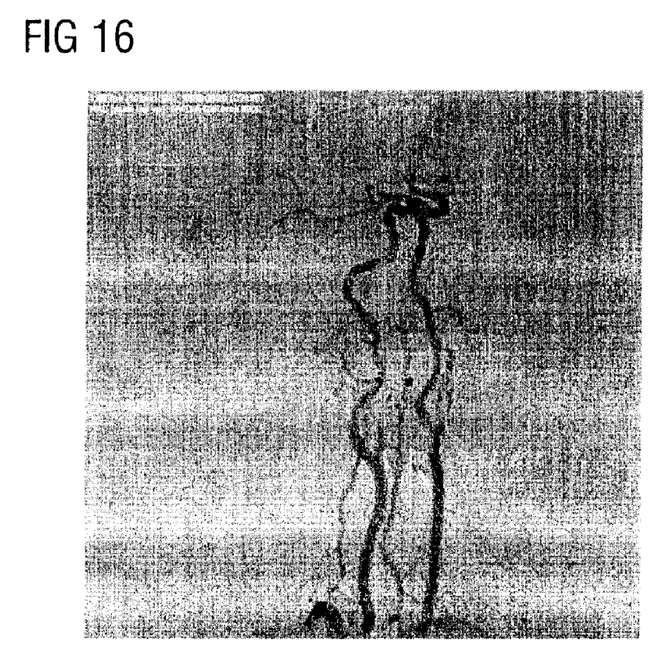
FIG. 16 is a subtraction image with GPU registration with sub-pixel precision, in which artifacts are reduced.
Figure 17:
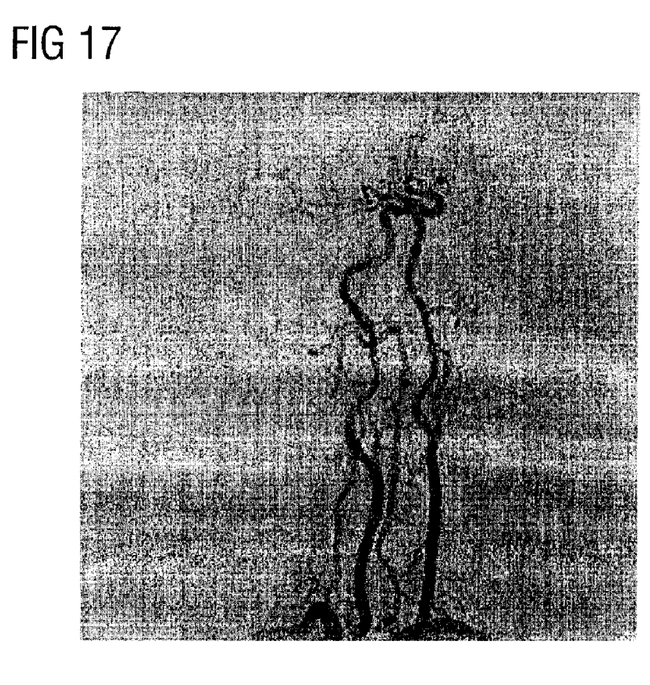
FIG. 17 is a subtraction image with CPU registration for comparison, in which the artifacts have been only partially eliminated.

Below, two calculation examples are given, which originate in the area of a human shoulder (FIGS. 6 through 11) and from the area of a human head (FIGS. 12 through 17). In each case, what are shown are the input images without contrast agent (FIGS. 6 and 11) and with contrast agent (FIGS. 7 and 12), the subtraction image before the registration with full-pixel precision and with sub-pixel precision. For comparison, a subtraction image recorded in a CPU is also used (FIGS. 11 and 17).

Figure 8:
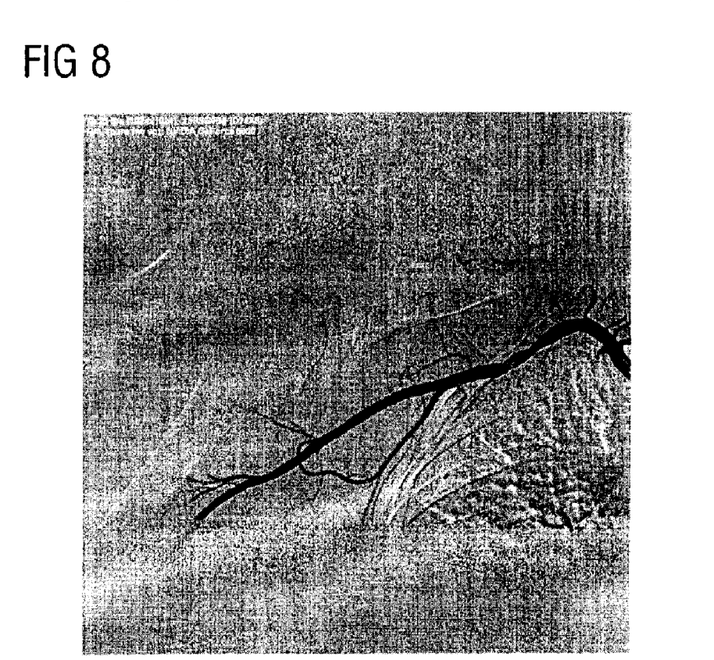
FIG. 8 is a subtraction image before the registration, in which pronounced artifacts are present.
Figure 9:
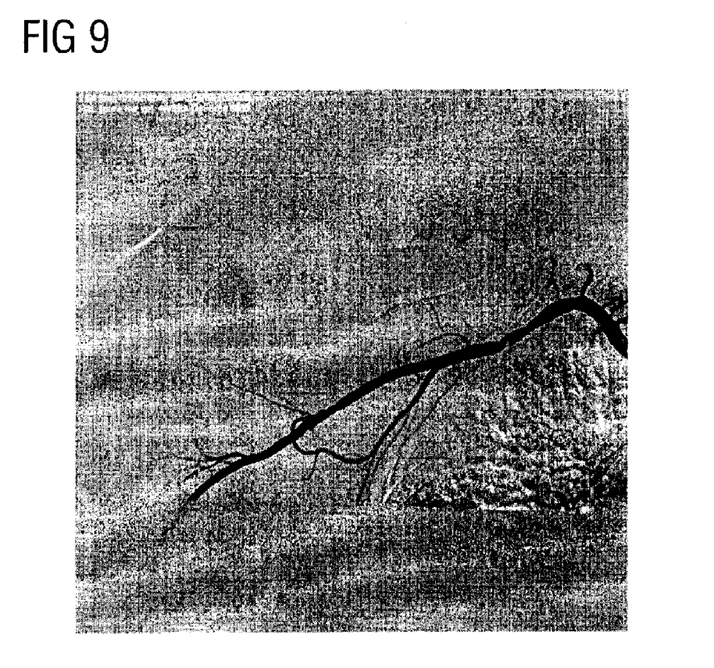
FIG. 9 is a subtraction image with GPU registration with full-pixel precision with considerably fewer artifacts.

In the subtraction image of the shoulder, pronounced artifacts can be seen in FIG. 8, which are already reduced considerably in FIG. 9 by the full-pixel registration. The sub-pixel registration in FIG. 10 provides still further improvement.

Figure 14:
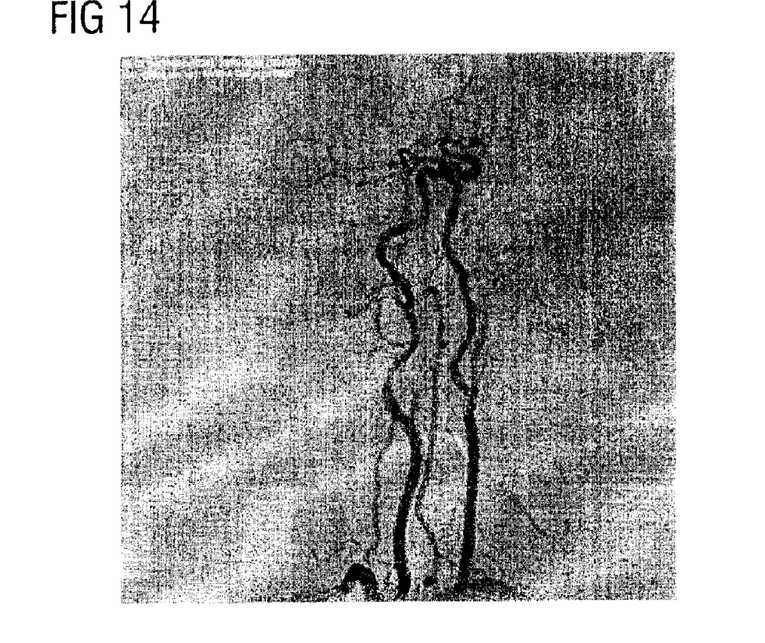
FIG. 14 is a subtraction image before the registration, in which there are slight artifacts.
Figure 15:
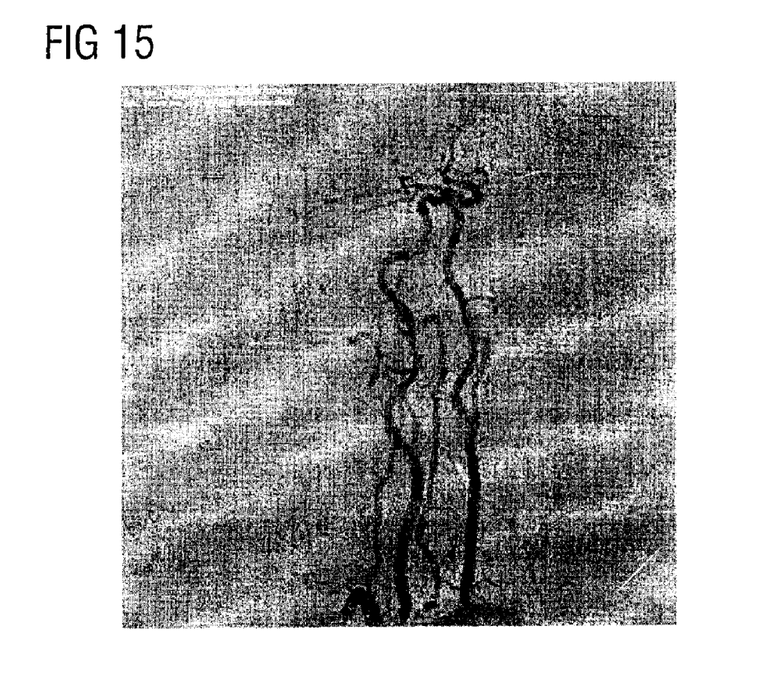
FIG. 15 is a subtraction image with GPU registration with full-pixel precision, in which no reduction in the artifacts can be observed.

In the subtraction image of the head, only slight artifacts can be seen in FIG. 14, which are not reduced by the full-pixel registration in FIG. 16. It is only the sub-pixel registration in FIG. 16 that eliminates the artifacts.

In both cases, the savings in computation time over CPU registration may be large.

A more detail embodiment is provided below after a further summary. An inherent disadvantage of digital subtraction angiography (DSA) is its sensitivity to patient motion which causes artifacts in the subtraction images. These artifacts could often reduce the diagnostic value of this technique. Automated, fast and accurate motion compensation is therefore desired. A method is explicitly designed to detect local motions in DSA. Then, a motion compensation algorithm is implemented by block matching on modern graphics hardware. Both methods search for maximal local similarity by evaluating a histogram-based measure. In this context, an optimizing search strategy is mapped on graphics hardware while paralleling block matching. Moreover, histograms are created on graphics hardware with vertex texturing and frame buffer blending. Both methods can effectively correct the artifacts in most cases, as the hardware implementation of block matching performs much faster. The displacements of two 1024×1024 images can be calculated at 3 frames per second with integer precision or 2 frames per second with sub-pixel precision in one embodiment.

Digital subtraction angiography (DSA) is the standard modality for visualizing human vasculature. This is achieved by acquiring a sequence of 2D digital X-ray projection images, accompanied by the injection of contrast medium into the vessels of interest. This sequence consists of a few contrast-free image (mask images) and mainly contrast-enhanced images (contrast images). In a successive step, one selected mask image is subtracted from each of the contrast images, so that the background structures are ideally masked out and only the vessels of interest are displayed. The background structures can only be removed completely when they are aligned perfectly and have equal gray-level distributions. The aim is to bring the mask and the contrast image in optimal spatial alignment prior to the subtraction. In order to correct complex motions, motion compensation approaches adapt to local deformations. Moreover, DSA is being increasingly applied in intervention, which requires fast and automatic methods. However, due to the computational complexity of related techniques, this requirement has been hardly satisfied. On many DSA systems, motion artifacts are still corrected by a simple global translation in x- or y-direction (known as pixel shift), which yields seldom satisfactory results.

An automated, fast and accurate solution to correct motion artifacts in DSA may be provided. The method corrects local deformations in DSA images. This method is referred as flexible pixel shift. For faster computation, a motion compensation algorithm is based on block matching on modern graphics hardware. The comparison of these two implementations shows that both implementations are capable of detecting delicate local displacements. The hardware implementation may perform much faster, so may be used as an interactive tool in clinical routine.

The utilization of graphics hardware (Graphics Processing Units, GPU) for motion compensation and image processing has become a field of active research in recent years. GPUs may be used for a block matching algorithm with a histogram-based similarity measure. An optimizing search strategy for block matching is mapped on GPUs. Histograms are created with vertex texture and frame buffer alpha blending, solving one of the most difficult tasks in general-purposed computation on GPUs.

Both flexible pixel shift and block matching are capable of detecting local motions in DSA. To this end, the displacement of a point is determined by moving it in its local neighborhood and searching for the maximal similarity. The difference between these two approaches is, flexible pixel shift moves only the point of interest with the given displacement vector while the location of the neighborhood with respect to the entire image is fixed. The displacements of the remaining points within the neighborhood are obtained via bilinear interpolation. Block matching assumes uniform displacement of the points within the neighborhood, thus the whole block is moved rigidly with the given displacement vector. Block matching, also referred as template matching, has been widely applied to detect motion in video images.

Flexible pixel shift may yield more accurate estimates for the displacement of a single point, because the best match is calculated exactly by moving that point alone. With block matching, the displacement of a control point is approximately determined by the displacement of the entire block. In cases of delicate motions, this approximation works when the block is small enough. However, smaller blocks contain little statistical information and may lead to unreliable matching scores. On the other hand, patient motion involving exactly one point as flexible pixel shift assumes, occurs seldom in the real world. Instead, more pixels in the neighborhood are often involved.

In practice, block matching performs faster than flexible pixel shift. The reason is the large number of bilinear interpolations which are necessary in flexible pixel shift even when the similarity is evaluated with integer displacements. On the contrary, bilinear interpolation is only computed in block matching in two cases: (1) when searching the displacements with sub-pixel precision, and (2) as displacements are only explicitly computed on selected control points, the displacement vector field of the entire image is obtained via interpolation, otherwise artifacts could occur at the block edges. In spite of the differences mentioned above, these two approaches share common properties in many aspects which are discussed in the following.

Similarity Measure

Both flexible pixel shift and block matching evaluate a similarity measure which determines the degree of correspondence between region of interests. A distinct property of DSA is the inflow of contrast medium into the vessels of interest, which causes significant local variation of the gray level distribution. Most similarity measures proposed so far, assume constant gray level distribution and are consequently not suited for DSA. A robust similarity measure against this gray level variation takes statistical information into account.

If the structures in two images are perfectly aligned, the subtraction image contains ideally only two different groups of intensity values, one for the background and one for the contrast enhanced vessels. This leads to two peaks in the probability density function of the gray values in the subtraction image. Accordingly, the gray value distribution of a block, which is a subset of the subtraction image, contains either two peaks if vessels are present, or one peak if it consists only of background structures. The amount of the distribution dispersion correlates thus tightly with the structural misalignment.

Generally, a measure quantifying the dispersion should satisfy the following two requirements: (1) it assumes its extreme when the distribution is totally "flat", i.e., all the entries give the equal contribution, and (2) it weights more clustering than dispersion. A well-known example is the Shannon entropy $$M_{ENT}(d) = -\Sigma p(i) \log p(i) \quad (1)$$

where $d \in Z^2$ denotes a given displacement vector and $p(i)$ denotes the probability distribution of the intensities in the subtraction image. The most straightforward way to resemble the probability density function is to create a normalized histogram $H(i)$ in which each entry is divided by the total number of entries ($\Sigma_{i=-I}^{I} H(i) = 1I$).

A generalized form of the Shannon entropy is the weighted sum of the normalized histogram entries $$M(d) = \sum_{i=-I}^{I} f(H(i)) \quad (2)$$

where $f: R+ \rightarrow R$ is a weighting function. Any differentiable, strictly convex or strictly concave function can be a suitable weighting function such that $M(d)$s satisfies the above requirements. Further, the energy of the histogram $$M_{EHD}(d) = \sum_{i=-I}^{I} H^2(i) \quad (3)$$

may be the most appropriate measure due to its relatively lower computational cost while the computation accuracy is retained. Note that MEHD is to be maximized, whereas MENT is to be minimized.

Search Strategy

The similarity measure $M(d)$ in Equation (1) to (3) is a function of the displacement d. The optimal alignment is found by searching for the extreme $M(d)$. The robustness of the full search is self-evident, because all the $(2w+1)^2$ positions within the search area are examined, w denoting the number of pixels in both search directions. This approach may have high computational cost. A more efficient strategy is the conjugate direction search which is carried out successively in n linearly independent conjugate directions, n being the number of variables in the objective function.

The complexity of conjugate direction search with a step size of 1 pixel can be easily derived. In the best case where the displacement is minimal, $d=(0, 0)$, only 5 positions (the starting position itself and its 4 neighbors) are examined. In the worst case where the displacement is maximal, $d=(w,w)$, $(2w+3)$ positions are examined. Thus, the complexity is reduced from $O(x2)$ by full search to $O(x)$ and $O(1)$ by conjugate direction search.

Sub-Pixel Accuracy

Even sub-pixel misalignment can cause significant artifacts in subtraction images. Therefore, the motion artifacts may be corrected with sub-pixel precision. As digital images contain only information about the pixels located at integer positions, interpolation is used. There exist mainly two approaches to perform the interpolation: (1) interpolating the similarity values calculated at integer displacements, and (2) computing the similarity values directly while shifting an image for non-integer displacements. The first approach requires the construction and analytical solution of a continuous bivariate function, whereas the latter approach can be achieved by bilinear interpolation which is a built-in operation on the GPU and can be carried out in real time.

A sub-pixel precision of 1/10 pixels is sufficient for angiography images. For the sake of efficiency, the search is usually carried out hierarchically, i.e., at first with integer precision, then with sub-pixel precision only in the neighborhood where the optimal integer displacement was found. The complexity can be derived likewise as with integer precision. 9 positions in the best case (the starting point itself, its 4 neighbors with integer precision and 4 neighbors with sub-pixel precision) and $2(wint+wsub+2)+1$ positions in worst case, wint and wsub being the search range for integer and sub-pixel precision respectively.

Hardware Implementation

Programmable Graphics Hardware

The data parallelism in typical image processing algorithms makes them well suited for the parallel pipelined architecture of the GPUs. An efficient mapping of such algorithms onto graphics hardware can thus lead to considerable performance gains.

The texture memory and its associated access operations may be used. Textures are bitmaps of pixel colors, which are designed to give 3D objects realistic visual complexity with little geometric data. For the purpose of image processing, the input images are usually loaded as textures onto the graphics card and the results, the manipulated images, are written into textures as well.

Textures are only bound to the pixel shader stage and random reading access to the texture memory (gathering) is allowed, which encourages the use of textures as a general read-only memory, with texture coordinates as the memory address. Textures may be used as general lookup tables to store information other than pixel colors.

The graphics processor may include vertex texturing, which enables texture fetch in the vertex shader stage and therewith allows the scattering. This feature is incorporated in Shader Model 3.0 and supported on GeForce 6 Series. It is possible now to implement algorithms where gathering and scattering are both required, e.g., sorting and histogram computation.

Implementation

Block matching is an algorithm which fits the architecture of parallel processors very well: the blocks are processed with the same operations and independently from each other, potential performance gains can thus be achieved by parallelizing the processing. All the blocks within the entire frame are shifted simultaneously, and the correspondence is calculated on a block basis. A full search block matching is mapped on the graphics hardware by passing the displacement vector as a global parameter to the GPU.

However, full search is computationally very intensive. In order to take advantage of optimizing search strategies, each block is moved with an individual displacement vector while all the blocks are moved simultaneously. The individual displacement vectors are stored in a texture which is used as a lookup table to increase speed. In order to avoid data transfer between CPU and GPU, this texture is stored on the GPU.

To further enhance the efficiency, the displacements (e.g., by block matching) are determined on selected control points defined by a regular grid. Any size block may be used, such as 51×51 pixels or 64×64 pixels. The DSA images have usually the dimension of 512×512 or 1024×1024, which ensures an exact decomposition of the input image into blocks.

The displacement of a control point is found by moving the respective block rigidly within the search space, i.e., all the pixels within the block are assumed to have the same displacement. When this displacement is then mapped uniformly to all the pixels within that block to construct the final displacement vector field, artifacts at the edges between the blocks may be introduced. To avoid this problem, the displacements of the remaining points (non-control points) are obtained by bilinear interpolation.

A problem hereby is, while the blocks are an exact partition of the image, the resulting displacement vector field does not cover the entire image, because the control points are located within the blocks. This problem is solved by extending the current grid by one cell in both x- and y-directions and setting the displacement of the points on the borders to zero. The points between are then interpolated.

The whole sequence is processed by fixing the mask image and registering the contrast image one after another with respect to the mask image. The motion compensation for an image pair is carried out with the following steps:

1. Initialize a set of displacement vectors and similarity scores $R=\{(d_i, s_i)\}$, $i=1, 2, \ldots, N$, N being the number of blocks.

2. Find the optimal displacement vectors following conjugate direction search.
   a Calculate the difference image from the mask and contrast images, whereby the i-th block (of the mask image) is shifted with the corresponding displacement vector $d_i$.
   b Maximize the similarity score $s_i=\text{MENT}(d_i)$ (Eq. (1)).

3. Construct the final displacement vector field $F(d_k)$, $k=1, 2, \ldots, M$, M being the number of pixels. Obtain the motion compensated subtraction image by warping the mask image with F.

Histogram of Differences

A histogram of an image or a portion of the image is usually implemented as an array, with the pixel intensities as the array indices. The input image is read pixel by pixel, and the corresponding array element is incremented. Thereby both random reading access and random writing access to the memory are necessary within one shader program. With vertex texturing, the filling histogram may be used on the GPU.

By projecting a 3D scene onto a 2D plane, more vertices may be mapped to the same position, with both color and depth information contained in a fragment. The final color of a pixel on the screen is the mixture of all the fragments which are supposed to display at the same position (alpha-blending). If all the input fragments have the same intensity and the alpha-blending function is set as additive, the frequency of the fragments can be retrieved from the final intensity of the output pixel.

To this end, the difference image P is bound as a texture to the vertex shader in order to scatter the pixels in P by their intensities. At first, a set V of vertices is firstly defined, with the cardinality of V being equal to the number of pixels in P. Then, we fetch for each vertex v in V the corresponding pixel 1 p from P and change the position of v according to the intensity of p. In particular, the intensity value and the block index of p are combined to build the x- and y-coordinates of v. As a result, the pixels in P are scattered not only with their intensity values, but also with their block indices. Herewith the histograms for all the blocks are filled in parallel within one rendering pass.

TABLE 1

| Usage | Size | Precision | Dimension |
| --- | --- | --- | --- |
| Input Image | 1024 × 1024 | 16-bit fixed-point | 1 |
| Difference Image | 1024 × 1024 | 32-bit floating-point | 1 |
| Histogram | 1024 × 256 | 16-bit floating-point | 4 |
| Displacement Vector | 16 × 16 | 32-bit floating-point | 4 |

Similarity Function

The histogram based similarity function is a weighted sum over the histogram entries (Equations (1) to (3)), which are stored in a texture. To sum up the values in a texture, the so called sum-reduce-operation is applied. Sum-reduction is similar as progressive down-sampling of the texture over multiple passes, where in each pass a local sum of n×n pixels of the source texture is written into one pixel of the target texture. The image is "reduced" by a factor of n along each axis with each pass. For an image of N×N pixels, $\log_n N$ passes are used. The global sum is finally written into a single pixel. As reading from and writing into the same texture is not allowed within one rendering pass, at lease two textures are used. After each pass, these two textures are alternated (ping-pong buffering).

Precision of the Computation

As graphics hardware of earlier generation supports only fixed-point arithmetic, the new superscalar architecture of GeForce 6 Series provides full 32-bit floating point accuracy, which enables computation with high precision in a much broader range. The texture formats used in the implementation are listed in Table 1. The input images are given as 16-bit unsigned short, which are loaded into a 16-bit fixed-point format directly. To store the difference image, a 32-bit floating-point format is used, because this texture will be bound to the vertex shader. Vertex textures support 32-bit floats, in order to handle large world and view spaces. The histogram is stored in a 16-bit floating-point format (half) which is the only available floating format supporting alpha-blending. The texture storing the displacement vectors and similarity scores is of 32-bit floating point format, so that the highest precision for the evaluation is guaranteed.

The 32-bit floating-point formats on GPUs follow the IEEE standard which is known as m23e8 format. This precision is usually sufficient for processing medical images which use 10-14 bits for a pixel. The 16-bit half format on GPUs has 10 bits for mantissa and 5 bits for exponent (m10e5). The number of mantissa bits dictates the precision. With 10 mantissa bits and 1 hidden bit, the half-format can precisely represent 211 equidistant numbers, e.g. integers. The blocks in one implementation have the size of 64×64 pixels. In extreme cases that all the pixels within a block have the same intensity value, the histogram entry of this value is 212 which can not be represented exactly with the half-format. However, this could only occur at the image corners where no structural information is available, hence the overall precision is not affected. By creating histogram for a larger block, more consideration concerning the precision is necessary.

The pixel depth of input images is 12 bits, i.e., theoretically there exist 213 different intensity values after the subtraction. This necessitates 8192 bins to hold the possible histogram entries (by a bin size of 1). Luckily, the differences between the mask and the contrast images are mostly in a very narrow range around zero. In fact, 1024 bins may be sufficient to compute the histogram. The texture for the histogram is thus of size 1024×256, storing histograms for 256 blocks with 1024 bins for each histogram.

Using two graphics cards of the Nvidia GeForce 6800 Series: 6800 and 6800 GT, the method may be implemented. The main features of these two cards are listed in Table 2.

TABLE 2

| Key Features | GeForce 6800 GT | GeForce 6800 |
|---|---|---|
| # pixel processors | 16 | 12 |
| # vertexp rocessors | 6 | 5 |
| Memory Type/Amount | GDDR3/256 MB | GDDR/128 MB |
| GPU Speed | 350 MHz | 325 MHz |
| RAM Speed | 1000 MHz | 700 MHz |

Four example datasets are shoulder, head, abdomen and hand. All data sets are acquired with an angiography unit (AXIOMArtis, Siemens Medical Solutions). Each data set consists of a sequence of 1024×1024 images with the first image as the mask image and the remainder as contrast images. The pixel depth is 12 bits while 16 bits are allocated. The block size is 64×64 pixels, accordingly an image is partitioned into 16×16 blocks. The displacement is computed with both integer (search step=1 pixel) and sub-pixel (search step=$\frac{1}{10}$ pixel) precision, where the search range is ±10 and ±0.5 pixels, respectively.

4 images are labeled with (a)-(d) and arranged as following:
(a) original subtraction image
(b) flexible pixel shift (implemented on CPU)
(c) block matching with integer precision (implemented on GPU)
(d) block matching with sub-pixel precision (implemented on GPU)

The number of images in each sequence, the corresponding computation time required to process the whole sequence are listed in Table 3. The computation time includes reading the image sequence from the main memory and transferring it to the GPU.

TABLE 3

| | | Computation time (seconds) | | | |
|---|---|---|---|---|---|
| | | integer | | sub-pixel | |
| Type | Number of images (N) | 6800 GT | 6800 | 6800 GT | 6800 |
| Head | 21 | 7.20 | 8.86 | 10.23 | 13.26 |
| Hand | 20 | 6.89 | 8.76 | 8.98 | 11.10 |
| Shoulder | 18 | 6.28 | 9.17 | 8.74 | 11.95 |
| Abdomen | 39 | 12.74 | 15.12 | 17.79 | 22.06 |

A user defined region of interest may be incorporated, such that the homogeneous regions, where no vessels of interests are present, can be excluded. Note that these regions make up to 50% area of the entire image, which indicates further reduction of the actual necessary computation time.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for non-rigid image registration by parallel processors, the method comprising:
applying a block-matching algorithm, such that the parallel processors execute the block-matching algorithm for a plurality of blocks of an image simultaneously;
creating a histogram with vertex texturing for each block of the plurality of blocks of the image simultaneously;
ascertaining histogram-based similarity standards; and
ascertaining displacement vectors.

2. The method as defined by claim 1, wherein a 2-dimensional non-rigid image registration for X-ray images of a digital subtraction angiography is effected, and the block-matching algorithm is executed on a graphics card with the parallel processors.

3. The method as defined by claim 2, wherein the displacement vectors are stored in memory on the graphics card.

4. The method as defined claim 1, wherein the block-matching algorithm generates the plurality of blocks.

5. The method as defined by claim 1, wherein the parallel processors create the histogram for the image or a detail of the image with the aid of frame buffer alpha blending.

6. The method as defined by claim 1, wherein ascertaining histogram-based similarity standards comprises calculating, with the parallel processors, the histogram-based similarity standards by sum reduction.

7. The method as defined by claim 1, wherein the block-matching algorithm generates the plurality of blocks, and
wherein the parallel processors terminate a search automatically when an optimal displacement for the plurality of blocks is found.

8. The method as defined by claim 7, wherein similarity values are read back to a central processing unit (CPU) and assessed at the CPU.

9. The method as defined by claim 1, wherein the parallel processors ascertain inconsistent displacements automatically and correct inconsistent displacements.

10. The method as defined by claim 1, wherein the displacement vectors are projected onto respective block centers, and a complete vector field is calculated by linear interpolation.

11. The method as defined by claim 1, wherein a complete block-matching algorithm for 2-dimensional or 3-dimensional image registration is implemented on the parallel processors.

12. The method as defined by claim 1, wherein the block-matching algorithm generates the plurality of blocks, and the block size is 64×64 pixels.

13. The method as defined by claim 1, wherein a sub-pixel registration is executed after a pixel registration is completed.

14. A method for accelerating 2-dimensional non-rigid image registration for digital subtraction angiography (DSA), the method comprising:
    performing a block-matching algorithm on a graphics card, the block-matching algorithm ascertaining displacement vectors by histogram-based similarity standards for a plurality of blocks;
    loading a mask image and a first contrast image as textures onto the graphics card;
    initializing two textures for storing the displacement vectors and similarity values in memory for the plurality of blocks;
    displacing the plurality of blocks in the mask image with the displacement vectors in one of the two textures;
    calculating a difference between the mask image and the first contrast image;
    storing a result in the memory in a different texture;
    creating disparity histograms simultaneously for the plurality of blocks;
    calculating a similarity function by sum reduction;
    comparing a current similarity value with a similarity value of a previous search position;
    determining a next search position;
    reading the similarity values back to a central processing unit;
    returning to initializing when an optimal displacement is not found for the plurality of blocks;
    ascertaining and correcting inconsistent displacements when the optimal displacement is found for the plurality of blocks;
    projecting the displacement vectors onto corresponding block centers and calculating a complete vector field by bilinear interpolation; and
    loading a next contrast image and performing the initializing.

15. The method as defined by claim 14, wherein a complete algorithm for 3-dimensional non-rigid image registration is implemented on parallel processors.

* * * * *